United States Patent
Zhang et al.

(10) Patent No.: US 9,247,334 B2
(45) Date of Patent: Jan. 26, 2016

(54) PORTABLE ELECTRONIC DEVICE

(71) Applicant: Huawei Technologies Co., Ltd., Shenzhen, Guangdong (CN)

(72) Inventors: Deming Zhang, Beijing (CN); David Virette, Munich (DE); Yue Lang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/554,298

(22) Filed: Nov. 26, 2014

(65) Prior Publication Data

US 2015/0078606 A1    Mar. 19, 2015

Related U.S. Application Data

(63) Continuation of application No. PCT/EP2012/064085, filed on Jul. 18, 2012.

(51) Int. Cl.
| | |
|---|---|
| *H04R 21/02* | (2006.01) |
| *H04R 1/08* | (2006.01) |
| *H04M 1/03* | (2006.01) |
| *H04R 5/027* | (2006.01) |
| *H04M 1/02* | (2006.01) |

(52) U.S. Cl.
CPC .................. *H04R 1/08* (2013.01); *H04M 1/035* (2013.01); *H04R 5/027* (2013.01); *H04M 1/0202* (2013.01); *H04R 2499/11* (2013.01)

(58) Field of Classification Search
CPC ......... H04M 1/035; H04R 1/08; H04R 5/027; H04R 2499/11
See application file for complete search history.

(56) References Cited

U.S. PATENT DOCUMENTS

2010/0111326 A1*   5/2010   Obata et al. ..................... 381/92

FOREIGN PATENT DOCUMENTS

| EP | 1 885 155 A1 | 2/2008 |
| JP | H025977 U | 1/1990 |

OTHER PUBLICATIONS

Hugh Robjohns, "Stereo Microphone Techniques Explained, Part 1", Feb. 1, 1997, 11 pages.

* cited by examiner

*Primary Examiner* — Tuan D Nguyen

(57) ABSTRACT

The invention relates to a portable electronic device, comprising: a housing comprising at least one hole; and at least two directional microphones mounted in the housing and placed coincidentally for stereo sound pickup, each one of the microphones defining a main sound axis and each one of the two directional microphones defining a direct sound direction and a opposite sound direction which describe opposite directions of the main sound axis, wherein the at least one hole is a common hole shared between the at least two directional microphones such that the main sound axis of the at least two directional microphones are pointing through the common hole in different directions.

17 Claims, 8 Drawing Sheets

PORTABLE ELECTRONIC DEVICE

CROSS-REFERENCE TO RELATED APPLICATIONS

This application is a continuation of International Application No. PCT/EP2012/064085, filed on Jul. 18, 2012, which is hereby incorporated by reference in its entirety.

BACKGROUND

The present invention relates to a portable electronic device with microphones for stereo audio recording, in particular to a mobile phone, a Smartphone and a Tablet PC with microphones for stereo audio recording.

XY techniques for stereo audio recording as depicted in FIG. 6 use two coincident microphones 605a, 605b, that means, microphone capsules at the same place, i.e., two microphones 605a, 605b are mounted closely together to prevent almost totally time delay effects. At ideal conditions, this results in pure intensity stereo signals which can be summed to mono without comb-filter effects. This provides an unrestricted mono compatibility.

The XY technique uses two identical directional microphones 605a, 605b, e.g., cardioid or figure eight microphones. In relation to the recording axis 610, they are arranged at equal and opposed offset angles α with regard to their main directions 602a of stereo recording.

Or put differently, in relation to the recording axis 610 of the directional microphone arrangement formed by the pair of coincident directional microphones 605a, 605b, the two coincident microphones 605a, 605b are arranged such that the directional microphones' direct sound directions 602a are offset from the recording axis 610 by equal and opposed offset angles α. The recording axis 610 is also referred to as recording direction 610 of the microphone arrangement, central axis 610 for stereo recording or central direction 610 for stereo recording. Typical offset angles α are between −/+30° and −/+60° apart from the central direction of the stereo recording represented by the recording axis 610. For cardioid microphones, as shown in FIG. 6, the X microphone 605b pointing leftward supplies the left signal directly, and the Y microphone 605a pointing rightward supplies the right signal. The stereophonic properties depend on the directional characteristics of the microphones and the offset angle α. A reduced angle α will provide a minimum or narrow stereo image, whereas a large angle α will provide a wider stereo image. Thus, the angle β as depicted in FIG. 6, with β=2*α, represents a measure of the width of the stereo image, wherein the larger angle β, the larger the perceived width of the stereo image.

FIG. 7 shows the Blumlein stereo arrangement based on figure eight microphones. The L microphone 705b has its main lobe pointing leftward and provides directly the left signal, while the R microphone 705a offers the perfect symmetry and provides the right signal. The two microphones 705a, 705b correspond to the two directional microphones 605a, 605b of FIG. 6, and the direct sound directions 702a of the two directional microphones 705a, 705b correspond to the direct sound directions 602a of the two directional microphones 605a, 605b of FIG. 6.

The Blumlein pair consists of an array of two matched microphones 705a, 705b of bi-directional pickup pattern, positioned β=90° from each other, which corresponds to an offset angle α of 45° for each of the two directional microphones 705a, 705b with regard to the central direction 710 for stereo recording. Ideally, the transducers should occupy the same physical space; as this is impossible the microphone capsules are placed as close to each other as physically possible, generally with one microphone 705a centered directly above the other microphone 705b. The microphone array is oriented so that the line 710 bisecting the angle β between the two microphones 705a, 705b, i.e. the recording axis 710 points towards the sound source to be recorded. The pickup patterns of the microphone pair combined with their positioning, delivers a high degree of stereo separation in the source signal.

There are two typical microphone configurations in current mobile phones. The first one has only one single omnidirectional microphone which is used for communication and mono sound pickup. The other configuration is shown in FIG. 8. The mobile phone has two omnidirectional microphones, a main microphone 813 and an auxiliary microphone 807. The main microphone 813 is arranged on the bottom side 817 of the mobile phone which can be associated together with dock connectors 809 for optional dock accessories and USB port 811. The auxiliary microphone 807 is located at the back side 815 or back cover 819 of the mobile phone together with camera 805, e.g., 5 megapixel camera with autofocus, camera flash 801 and speaker 803. The main microphone 813 is used for the sound pick up, i.e., for communication application as well as simple audio/video recording. The auxiliary microphone 807 is used for noise cancellation and gain control.

SUMMARY

It is the object of the disclosure to describe a mobile device such as a mobile phone, a Smartphone or a Tablet PC with stereo sound pick up ability.

It is a further object of the disclosure to describe a mobile device such as a mobile phone, a Smartphone or a Tablet PC with improved stereo sound pick up ability.

These objects may be achieved by the features of the independent claims. Further implementation forms are apparent from the dependent claims, the description and the figures.

The invention is based on the finding that employing directional microphones in a mobile device, e.g. in a mobile phone, not only introduces stereo sound pick up ability for mobile devices but introduces an improved stereo sound pick up ability compared to a use of omnidirectional microphones. Furthermore, the present invention describes a specific housing for directional microphones. Normally, the thickness of Smartphones is constrained to several millimeters; this specific form factor is quite different from other terminals such as cameras and camcorders and imposes different constraints in terms of microphone positions and housing. The present invention improves the situation by placing two directional microphones coincidentally for stereo sound pickup, wherein a common hole in the housing is shared by the two microphones. Due to the minimum distance between the coincident microphones such a common hole arrangement provides better left/right separation and wider stereo sound images for small portable electronic devices, e.g. mobile phones, smartphones and tablet PCs. At the same time this coincident arrangement of the directional microphones and the common hole arrangement offers a place-saving design for the mobile device and allows to keep the number and size of holes in the housing of the mobile device at a minimum.

An omnidirectional microphone needs only one hole in the terminal as opposed to directional microphones which require two holes. The omnidirectional microphone offers a uniform directivity pattern in all directions, equivalent to a sphere, and only one hole is then required for the microphone housing 813. The size of the hole and the actual microphone housing 813 will affect the directivity of the complete system, but a single hole is sufficient for perfect sound pickup. Two omnidirectional microphones mounted with a spacing of several centimeters can also be used in order to obtain a stereo recording, however, such system will provide only a limited stereo image, due to the short distance when mounted on a mobile phone and the uniform directivity which limits the energy differences between the signals picked up by the two microphones. It is then possible to use directional microphones, Such designs need four separate holes, two for each directional microphone, i.e. one for the direct sound direction and one for the opposite sound direction for each of the two directional microphones. As the holes for the opposite directions have to be arranged at the opposite side of the head of the microphone, the positioning of the directional microphones is limited by other technical design constraints like the interior arrangement of the other components, e.g. the circuit board, the display or the battery pack, of the portable electronic device. In order to limit the impact of the housing on the directional microphone directivity, the holes have to be sufficiently large. In case of four separate holes, this can have a strong impact on the design of the portable electronic device.

In order to describe the invention in detail, the following terms, abbreviations and notations will be used:

Mic: microphone,
L: left channel,
R: right channel,
A, B, C: users.

Within the context of this application, the terms "sound pick up" and "sound recording" are used synonymously, if not mentioned differently, and refer in general to the conversion of acoustical signals into electronic signals. In other words, the term "sound recording" shall not be interpreted in the limited sense of recording and storing the audio signals (e.g. in analogue or digital form in a memory or on a tape or on any other storage medium) as the embodiments of the invention can also be used for simply converting the acoustic signals into electronic signals to send them to any information sink, wherein the information sink maybe another terminal, a storage medium, etc.

In the following, directivity polar patterns are defined. A given microphone's pattern of directivity, called its polar pattern is defined by the particular transducer design implemented in its capsule. A polar diagram or a polar pattern is a form of a two-dimensional contour map showing the microphone's output usually in dB at different angles of incident of a sound wave. The greater the plot is from the center the greater the output of the microphone is at that angle. A diagrammatic representation of a given capsule's polar pattern is intended to show its average response. Exact patterns will be frequency dependent. In general most off-axis attenuation occurs with higher frequencies where wavelength is shorter and the masking effect of the body is therefore greatest.

The following five most common directivity characteristics are known as:
 omni-directional (all around),
 figure eight (bi-directional) front and rear,
 cardioid (unidirectional) heart shaped,
 super cardioid,
 hyper cardioid,
wherein, term directional microphone is used as the generic term for all microphones which are not omnidirectional microphones, and refers to microphones that respond differently to sounds arriving from different directions, wherein the direction dependent sensitivity to acoustic signals is defined or described by the directional microphones' directivity pattern.

In more detail, all microphones work by sensing the pressure difference on either side of a thin sheet known as a diaphragm. Ultimately, there are really only two fundamental microphone principles—pressure-operated (omnidirectional) and pressure-gradient (directional).

In a pressure-operated microphone, one side of the diaphragm is open to the atmosphere and is able to respond to the microscopic changes in pressure representing sound. The other side faces an enclosed volume which effectively contains a fixed 'reference' air pressure so the diaphragm moves in response to the difference between the passing sound wave and the reference. It doesn't matter from which direction the sound wave comes, or where it is headed, the microphone merely senses its presence, and is therefore omnidirectional in its polar pattern.

In a pressure-gradient microphone, the diaphragm is still sensitive to the difference in pressure on either side, but this time both sides are exposed to the atmosphere, and therefore to the changing pressure caused by passing sound waves. A sound arriving in the plane of the diaphragm will present identical pressures on both sides and, consequently, there will be no net movement. There is no pressure gradient across the diaphragm and so the microphone is deaf to sounds on this axis. In contrast, sounds arriving perpendicular to the diaphragm will create a large pressure difference between front and rear, and it will be moved a maximum amount as a result. This mechanism's polar pattern therefore looks like a figure eight, with the maximum sensitivity to sound on-axis to the diaphragm and the minimum sensitivity perpendicular to this. The same principal applies to cardioid, super cardioids and hyper cardioid microphones.

Accordingly, the term directional microphone encompasses, for example, figure eight microphones, cardioid heart shaped microphones, super cardioid microphones and hyper cardioid microphones but not omnidirectional microphones.

The term "coincident microphones" refers to two (or more) microphones which are placed as close as possible to each other so that the path length from any sound source to either microphone of the coincident microphones is for all practical purposes, the same. Indeed, the distance between the microphones can be then considered as negligible compared to the wavelength of the audio signal. Therefore, the term "coincident microphones" refers to a microphone arrangement, wherein the two or more microphones, typically a pair of directional microphones, are arranged less than 2 cm spaced apart from each other, preferably less than 1 cm spaced apart from each other, and more preferably overlap, wherein the closer the transducers of the coincident microphones are the smaller the propagation delay between the coincident microphones and the better the stereo image obtained by, for example, simply using the audio signals obtained from the coincident directional microphones.

According to a first aspect, the invention relates to a portable electronic device, comprising: a housing comprising at least one hole; and at least two directional microphones mounted in the housing and placed coincidentally for stereo sound pickup, each one of the directional microphones defining a main sound axis, a direct sound direction and an opposite sound direction.

Such a portable electronic device provides better left/right separation and wider stereo sound image for small portable electronic devices, e.g. for mobile phones, smartphones and tablet PCs. Besides, a place-saving design can be used for an implementation of the mobile device.

The main sound axis is the axis which is defined by the axis between the point where the sensitivity of a directional microphone is at its maximum and the microphone itself, The direct sound direction is the direction in which the sensitivity is at its maximum with positive weighting, the opposite sound direction is in opposite direction to the direct sound direction. The direct sound direction and the opposite sound direction describe opposite directions of the main sound axis. The housing can comprise separate holes for each of the direct and opposite sound directions of the coincident microphones or common holes. The microphones are placed coincidentally in the housing, i.e., the microphones are located at the same place in the housing, for example by using microphone capsules at the same place, i.e., two microphones mounted closely together to prevent almost totally time delay effects.

In a first possible implementation form of the portable electronic device according to the first aspect, the at least one hole is a common hole shared between the at least two directional microphones such that the direct sound directions of the at least two directional microphones are pointing through the common hole in different directions.

Portable electronic devices according to the first implementation form comprising coincident directional microphones allow to design and manufacture housings, which only comprise one common hole instead of two or more holes for the direct sound directions of the at least two directional microphones. The common hole can be the smaller, the smaller the distance between the diaphragms of the coincident microphones.

The common hole is a hole arranged for sound pickup in the direct sound direction, the other two holes required for the two directional microphones are holes arranged for sound pickup in the opposite sound direction. The common hole can but does not have to be located in the front side of the housing. The other two holes can but do not have to be located in the back side of the housing. The main sound direction of each microphone is oriented towards the common hole. More specifically, the direct sound direction of each microphone is oriented towards the common hole. The direct sound direction may be aligned to a coordinate in the common hole such that it points through the common hole. The opposite sound direction of each microphone is oriented towards a respective one of the other two holes. The opposite sound direction may be aligned to a center of the respective other hole or to another coordinate in the respective other hole. The housing can comprise one further large hole instead of the other two holes, which can be small in size.

In a second possible implementation form of the portable electronic device according to the first aspect or the first implementation form of the first aspect, the housing is configured for housing the portable electronic device and is formed as a plate defined by two main areas framed by a top side, a bottom side and two lateral sides, wherein the two main areas define a front side and a back side of the housing.

The plate is a hollow plate for accommodating the printed circuit board with the electronic circuits of the portable electronic device. Its edges can be rounded for avoiding any risk of injury. The housing may be formed of synthetic material or plastics. The housing may be a common housing of a mobile phone such as depicted in FIG. 8. The screen is usually arranged at the front side of the housing, i.e. at that side which is one of the main areas of the plate. The main areas are the areas which have the largest size. The front side of the plate or of the housing is that side which faces to the user when he is interacting with the electronic device. The back side is the side opposed to the front side. Depending on the spatial position of the electronic device, the top side may be the side at the top position of the electronic device, the bottom side may be the side at the bottom position of the electronic device and the lateral sides may be the sides at lateral positions of the electronic device.

It is to be understood that the housing may have many different designs, and that, in particular, the back side, the top side, the bottom side and the two lateral sides are not limited to sides which are flat and arranged rectangular to adjacent sides. On the contrary, the housings of the portable electronic devices according to the first aspect and any of its implementation forms may have many different designs, wherein in particular, the back side, the top side, the bottom side and the two lateral sides can be flat, curved, graded, etc., and wherein, furthermore, depending on the form of the sides the transition between neighboring sides may be smooth, in particular in case of radiated or rounded backsides.

In a third possible implementation form of the portable electronic device according to the second implementation form of the first aspect, the housing comprises a second hole and a third hole; and the at least two directional microphones are mounted in the housing such that the opposite direction of a first one of the at least two microphones is oriented towards the second hole and that the opposite direction of a second one of the at least two microphones is oriented towards the third hole.

In a fourth possible implementation form of the portable electronic device according to the third implementation form of the first aspect, the common hole is located in the bottom side of the housing such that directivity polar pattern of the at least two directional microphones are directed towards the bottom side of the housing; and the second hole is located in a bottom section of the front side and the third hole is located in a bottom section of the back side of the housing.

The directivity polar patterns are oriented towards the direct sound direction of the microphones.

Portable electronic devices according to the fourth implementation form introduce minimum impact on the rest of the interior technical design of the portable electronic device as the coincident microphones are arranged at the bottom of the housing, and allow to pick up stereo images with a wide stereo image and clear left and right separation of audio sources.

In a fifth possible implementation form of the portable electronic device according to the third implementation form of the first aspect, the common hole is located in the top side of the housing such that directivity polar pattern of the at least two directional microphones are directed towards the top side of the housing; and the second hole is located in a top section of the front side and the third hole is located in a top section of the back side of the housing.

Portable electronic devices according to the fifth implementation form introduce minimum impact on the rest of the interior technical design of the portable electronic device as the coincident microphones are arranged at the bottom of the housing, and allow to pick up stereo images with a wide stereo image and clear left and right separation of audio sources by holding the portable electronic device like a digital recorder, i.e. the topside directed towards the audio sources.

In a sixth possible implementation form of the portable electronic device according to the third implementation form of the first aspect, the common hole is located in the front side of the housing such that a directivity polar pattern of the at least two directional microphones are directed towards the front side of the housing; and the second hole and the third hole are located in the bottom side of the housing.

Portable electronic devices according to the sixth implementation form introduce minimum impact on the rest of the interior technical design of the portable electronic device as the coincident microphones are arranged at the bottom of the housing, and allow to pick up stereo images with a wide stereo image and clear left and right separation of audio sources in any of the typical usage positions of a mobile phone or smart phone, e.g. when holding it to the ear, but in particular in usage positions as typical for conference calls and video conference calls, where the terminal is fixed or held in front of the user and other users participating in the conference call, the front side comprising the display and optionally the camera facing towards the user and the direct sound directions of the directional microphones also pointing toward the user and the other participants of the conference. Due to the clear left and right separation of the audio sources, the voices of the different participants can be more easily separated by the listener on the other side of the conference call.

In a seventh possible implementation form of the portable electronic device according to the first aspect as such or according to any of the preceding implementation forms of the first aspect, the two directional microphones are arranged in the housing (101) to form an angle β determining a stereo image width of the two directional microphones, in particular an angle β between 60 and 120 degrees.

In an eighth possible implementation form of the portable electronic device according to any of the third to the seventh implementation forms of the first aspect, the common hole and the second and third holes are arranged in the housing to form an angle γ determining a directivity of the two microphones.

In a ninth possible implementation form of the portable electronic device according to any of the implementation forms of the first aspect, the portable electronic device comprises four directional microphones and at least a first and a second common hole, wherein the first common hole is a common hole shared between the first and the second directional microphones; and wherein the second common hole is a common hole shared between the third and the fourth directional microphones.

In a tenth possible implementation form of the portable electronic device according to the ninth implementation form of the first aspect, the portable electronic device comprises a third and a fourth common hole, wherein the third common hole is a common hole shared between the first and the second directional microphones; and wherein the fourth common hole is a common hole shared between the third and the fourth directional microphones.

In an eleventh possible implementation form of the portable electronic device according to the ninth or tenth implementation form of the first aspect, the first and the second common hole are located in the front side of the housing.

Portable electronic devices according to the eleventh possible implementation form introduce a first and a second hole in the front side of the housing, wherein the direct sound direction of the first directional microphone and the opposite sound direction of the second directional microphone are oriented towards the first hole and wherein the direct sound direction of the third directional microphone and the opposite sound direction of the fourth directional microphone are oriented towards the second hole.

In a twelfth possible implementation form of the portable electronic device according to the tenth or eleventh implementation form of the first aspect, the third and the fourth common hole are located in the back side of the housing.

In a thirteenth possible implementation form of the portable electronic device according to any of the ninth to twelfth implementation form of the first aspect, the first and the third directional microphones and the second and the fourth directional microphones are arranged as pairs of coincident directional microphones in the housing.

In a fourteenth possible implementation form of the portable electronic device according to the thirteenth implementation form of the first aspect, the two pairs of coincident directional microphones are arranged in the housing to form an angle β determining a stereo image width of the two pairs of microphones, in particular an angle β between 60 and 120 degrees.

In a fifteenth possible implementation form of the portable electronic device according to the thirteenth implementation form or according to the fourteenth implementation form of the first aspect, the portable electronic device comprises a first camera mounted in the front side of the housing, a second camera mounted in the back side of the housing and a controller configured to control the selection of one of the two pairs of coincident directional microphones and the selection of one of the two cameras.

In a sixteenth possible implementation form of the portable electronic device according to any of the thirteenth to fifteenth implementation forms of the first aspect, the portable electronic device comprises a first camera mounted in the front side of the housing, a second camera mounted in the back side of the housing and a controller configured to control the selection of one of the two pairs of microphones and selection of one of the two cameras such that the pair of coincident directional microphones with a recording direction in direction of the front side is selected when the first camera is selected and/or that the pair of coincident directional microphones with a recording direction in direction of the backside side is selected when the second camera is selected.

One of the advantages of these implementation forms is the capacity to control the orientation of the stereo recording toward the selected side. The selection of the pair of directional microphones can be controlled together with the selection of the camera. When the terminal is equipped for video-conferencing applications with two cameras, e.g. one camera positioned in the front and another camera on the back, the user can select which camera is used and transmitted. In this implementation form, the selection of the pair of microphones can be associated with the selected camera.

In a seventeenth possible implementation form of the portable electronic device according to any of the ninth to the sixteenth implementation forms of the first aspect, the four directional microphones are arranged in the housing such that the direct sound directions of the first directional microphone points to the opposite sound directions of the second directional microphone and such that the direct sound direction of the third directional microphone points to the opposite sound direction of the fourth directional microphone.

In an eighteenth possible implementation form of the portable electronic device according to any of the preceding implementation forms of the first aspect, the at least two directional microphones are cardioid microphones or figure-eight microphones.

In a nineteenth possible implementation form of the portable electronic device according to any of the preceding implementation forms of the first aspect, a thickness of the housing is smaller than 2 cm, in particular smaller than 1 cm.

In a twentieth possible implementation form of the portable electronic device according to the first implementation form of the first aspect, the portable electronic device comprises four directional microphones and a first and a second common hole, wherein the first common hole is a common hole shared between the four directional microphones; and wherein the second common hole is a common hole shared between the four directional microphones.

According to a second aspect, the invention relates to a method for producing a portable electronic device, comprising: providing a housing comprising at least one hole; and mounting at least two directional microphones coincidentally in the housing for stereo sound pickup, each one of the microphones defining a direct sound direction and an opposite sound direction, wherein the at least one hole is a common hole shared between the at least two directional microphones such that the direct sound directions of the at least two directional microphones are oriented towards the common hole.

According to a third aspect, the invention relates to a method for operating a portable electronic device, comprising: operating the portable electronic device comprising a housing comprising at least one hole; and at least two directional microphones mounted in the housing and placed coincidentally for stereo sound pickup, each one of the microphones defining a direct sound direction and an opposite sound direction, wherein the at least one hole is a common hole shared between the at least two directional microphones such that the direct sound directions of the at least two directional microphones are oriented towards the common hole.

The implementation forms of the first, second and third aspects can be easily adapted such that the direct sound directions and the opposite sound directions of the directional microphones are exchanged with respect to the ones described in the previous implementation forms. Hence, the opposite sound directions of the at least two directional microphones are pointing through the common hole in different directions. All the corresponding implementation forms can be easily derived from the previous implementation forms.

BRIEF DESCRIPTION OF THE DRAWINGS

Further embodiments of the invention will be described with respect to the following figures, in which.

DETAILED DESCRIPTION

Figure 1:
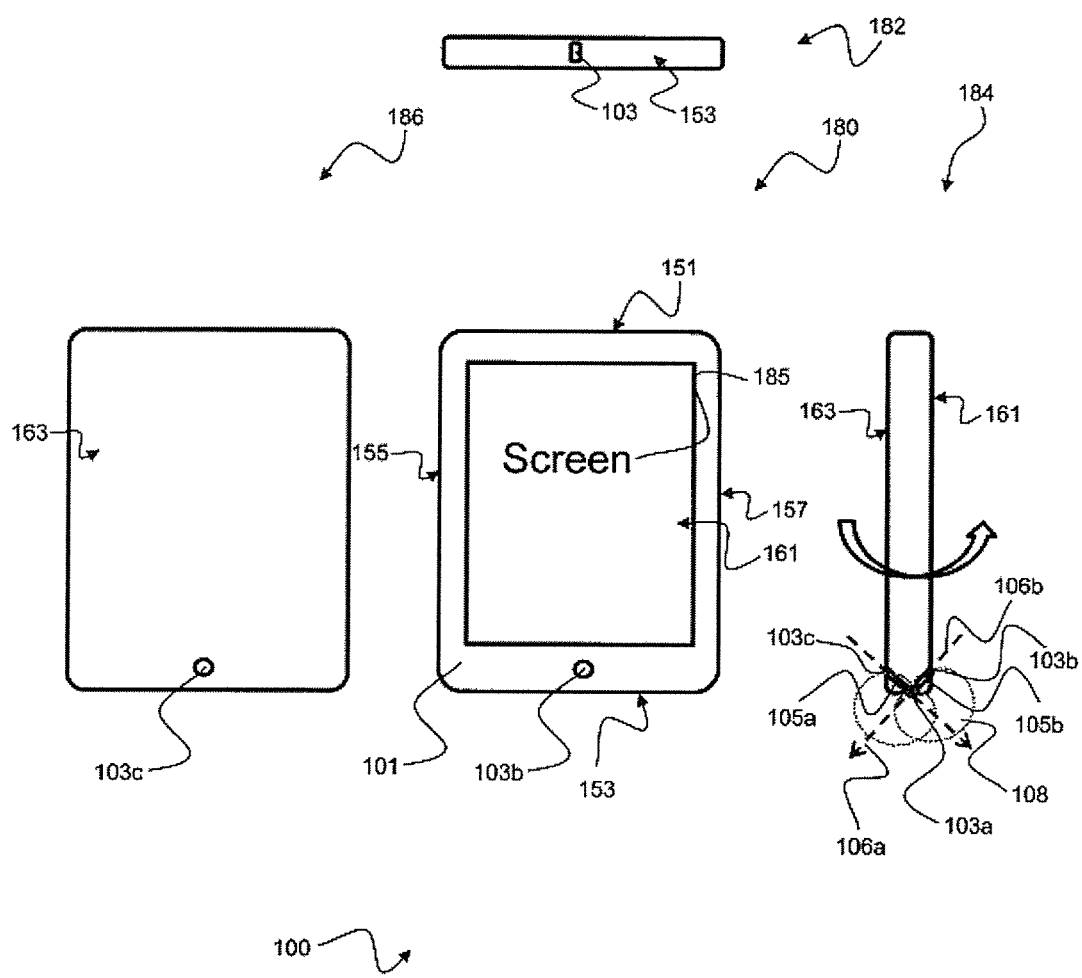
FIG. 1 shows a perspective diagram including front view, back view, bottom view and side view of a portable electronic device arranged in portrait position according to an implementation form.

FIG. 1 shows a perspective diagram including front view 180, back view 186, bottom view 182 and side view 184 of a portable electronic device 100 arranged in portrait position according to an implementation form.

The portable electronic device 100 comprises two directional microphones 105a, 105b for stereo sound pickup. Each one of the two directional microphones 105a, 105b defines a direct sound direction 106a and an opposite sound direction 106b towards which the directional microphones 105a, 105b are directed. The portable electronic device 100 comprises a housing 101 for housing the portable electronic device 100, for example the electronic circuits and printed circuit board of the portable electronic device 100. For both directional microphones 105a, 105b a common hole 103a is mounted in the housing 101 and for each of the directional microphones 105a, 105b two other holes are mounted in the housing 101, a second hole 103b for the first directional microphone 105a and a third hole 103c for the second directional microphone 105b. The common hole 103a is mounted in the bottom side 153 of the housing 101, the second hole 103b is mounted in the front side 161 of the housing 101 and the third hole 103c is mounted in the back side 163 of the housing 101. The two directional microphones 105a, 105b are pointing through the common hole 103a in different directions.

When the housing 101 has the typical form of a mobile phone housing, i.e., as a rectangular hollow plate with round edges, the second and third holes 103b, 103c for the microphones 105a, 105b are mounted in the front 161 and back 163 sides of the housing 101 and the common hole 103a shared by both microphones 105a, 105b is mounted in the bottom side 153. In an alternative implementation form, the second and third holes 103b, 103c for the microphones 105a, 105b are mounted in the front 161 and back 163 sides of the housing 101 and the common hole 103a shared by both microphones 105a, 105b is mounted in the top side 153.

The two directional microphones 105a, 105b are placed coincidentally in the housing 101, i.e., placed at the same position of the housing 101. The direct sound direction 106a of each microphone 105a, 105b is oriented towards the common hole 103a and the opposite sound direction 106b of each microphone 105a, 105b is oriented towards the second 103b and the third 103c hole, respectively.

In an implementation form, the portable electronic device is a mobile phone. In an implementation form, the portable electronic device is a Smartphone. In an implementation form, the portable electronic device is a Tablet PC.

Figure 8:
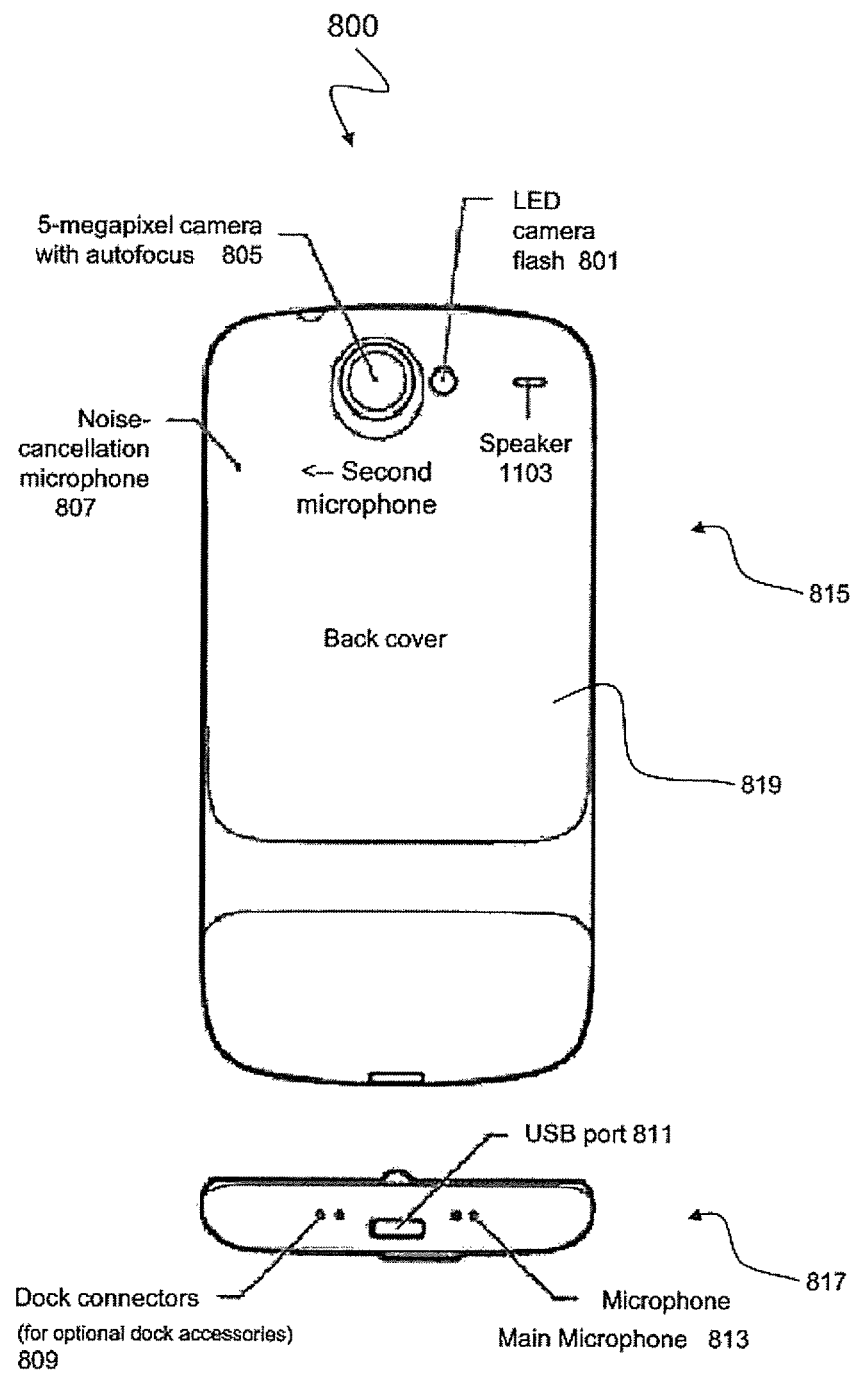
FIG. 8 shows a perspective diagram including back view and bottom view of a conventional mobile phone.

The housing 101 is formed as a hollow plate defined by two main areas, which are the areas of largest size, which are here the area carrying the screen 185 and the area opposite thereof, i.e., the back cover side which may carry the camera as depicted in FIG. 8. These two main areas define the front side 161 and the back side 163 of the housing 101. The front side 161 and the back side 163 are framed by a top side 151, a bottom side 153 and a first 155 and a second 157 lateral side. The top side 151 is located at the top of the mobile device 100 in the front view 180 illustration of FIG. 1. The bottom side 153 is located at the bottom of the mobile device 100 in the front view 180 illustration. The first lateral side 155 is located at the left side of the mobile device 100 in the front view 180 illustration and the second lateral side 157 is located at the right side of the mobile device 100 in the front view 180 illustration.

In an implementation form, the housing 101 is formed as a rectangular plate. In an implementation form, the housing is formed as a square plate.

In further embodiments the housing 101 may have different designs, wherein in particular, the back side 163, the top side 151, the bottom side 153 and the two lateral sides 155, 157 can be flat, curved, graded, etc., and wherein, furthermore, depending on the form of the sides the transition between neighboring sides may be smooth, in particular in case of radiated or rounded backsides.

In an implementation form, the two directional microphones 105a, 105b are cardioid microphones or figure-eight microphones. In an implementation form, the housing 101 has a thickness smaller than 2 cm, e.g., when the housing 101 houses a Notebook. In an implementation form, the housing 101 has a thickness smaller than 1 cm, e.g., when the housing 101 houses a TabletPC. In an implementation form, the housing 101 has a thickness smaller than 0.8 cm, e.g., when the housing 101 houses a mobile phone or a Smartphone.

In an implementation form, the common hole 103a is located in the bottom side 153 of the housing 101 such that directivity polar patterns 108 of the two directional microphones 105a, 105b are directed towards the bottom side 153 of the housing 101. The second hole 103b is located in a bottom section of the front side 161 and the third hole 103c is located in a bottom section of the back side 163 of the housing 101. According to this positioning of the holes 103a, 103b, 103c, the directivity polar patterns 108 of the two directional microphones 105a, 105b are directed towards the bottom side 153 of the housing 101.

In an alternative implementation form, the common hole 103a is located in the top side 151 of the housing 101 such that directivity polar patterns 108 of the two directional microphones 105a, 105b are directed towards the top side 151 of the housing 101. The second hole 103b is located in a top section of the front side 161 and the third hole 103c is located in a top section of the back side 163 of the housing 101. According to this positioning of the holes 103a, 103b, 103c, the directivity polar patterns 108 of the two directional microphones 105a, 105b are directed towards the top side 151 of the housing 101.

Unlike omnidirectional microphones, directional microphones need two holes 103a, 103b in the housing 101 in order to measure the sound pressure gradient. According to aspects of the invention, one of those two holes 103a, 103b is a common hole shared by both directional microphones.

The common hole 103a is shared between the two directional microphones 105a, 105b. This hole 103a is located at the bottom 153 of the device 100. The other two holes 103b, 103c are placed in the front 161 and back side 163 of the device 100 respectively. The directivity polar patterns 108 of the two microphones 105a, 105b are directed toward the bottom 153 of the device 100. In an alternative embodiment, the stereo microphone 105a, 105b points toward the top 151 of the device 100. The common hole 103a is located at the top 151 of the device 100 and the two other holes 103b, 103c are in the top front and top back side of the device 100. This kind of stereo microphone can be used for stereo recording, e.g., for reporter applications.

Figure 2:
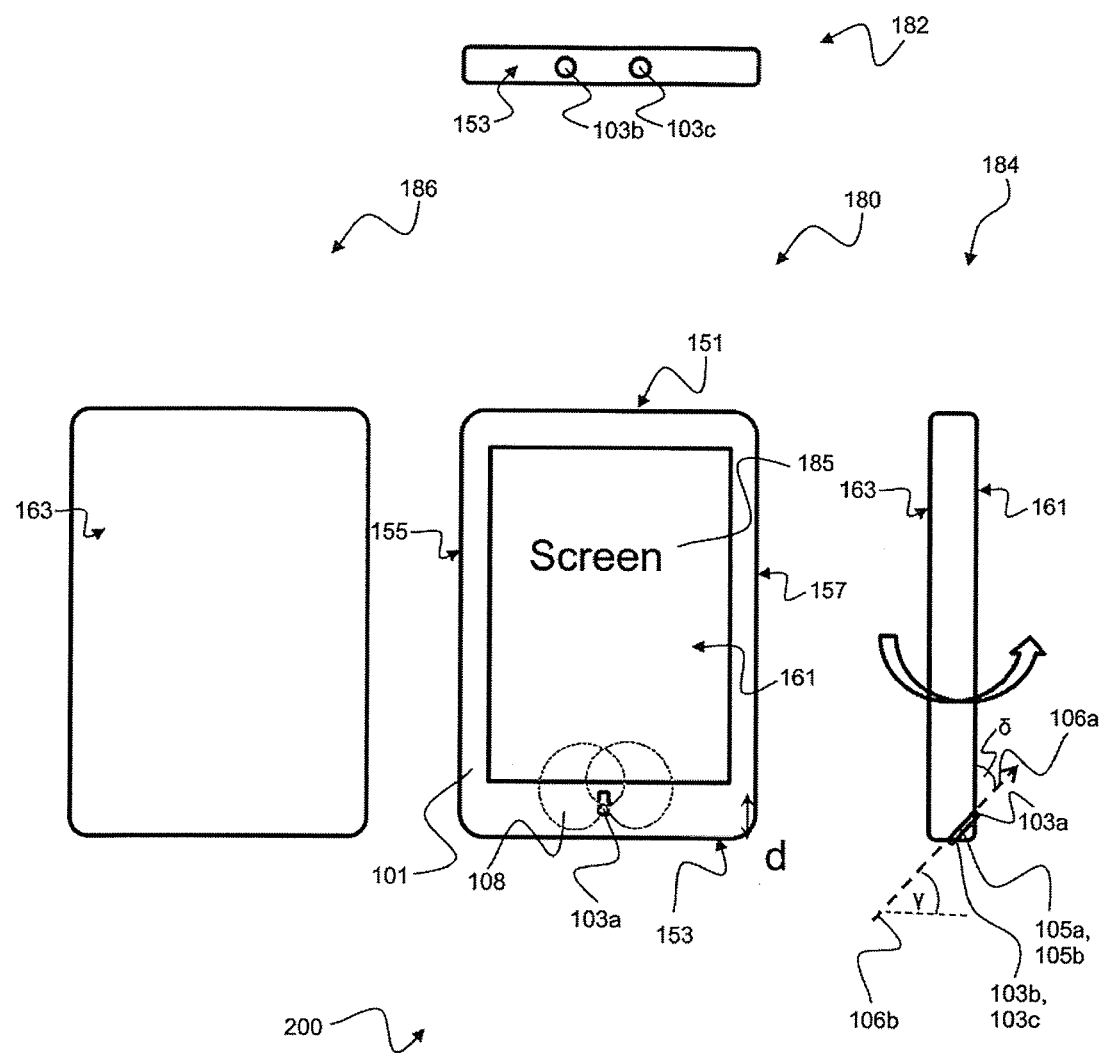
FIG. 2 shows a perspective diagram including front view, back view, bottom view and side view of a portable electronic device arranged in portrait position according to an implementation form.

FIG. 2 shows a perspective diagram including front view 180, back view 186, bottom view 182 and side view 184 of a portable electronic device 200 arranged in portrait position according to an implementation form.

The portable electronic device 200 comprises two directional microphones 105a, 105b for stereo sound pickup. Each one of the two directional microphones 105a, 105b defines a direct sound direction 106a and an opposite sound direction 106b towards which the directional microphones 105a, 105b are directed. The portable electronic device 200 comprises a housing 101 for housing the electronic circuits and printed circuit board of the portable electronic device 200. For both directional microphones 105a, 105b a common hole 103a is mounted in the housing 101 and for each of the directional microphones 105a, 105b two other holes are mounted in the housing 101, a second hole 103b for the first directional microphone 105a and a third hole 103c for the second directional microphone 105b. The common hole 103a is mounted in the front side 161 of the housing 101, the second hole 103b and the third hole 103c are mounted in the bottom side 153 of the housing 101. By that location of the holes 103a, 103b, 103c and microphones 105a, 105b the directivity polar patterns 108 of the two directional microphones 105a, 105b are directed towards the front side 161 of the housing 101 under an angle γ with respect to horizontal (according to the orientation of FIG. 2, or more general with respect to the orthogonal of the plane defined by the front side) and under an angle δ with regard to the plane defined by the front side 161, wherein γ+δ=90°.

When the housing 101 has the typical form of a mobile phone housing, i.e., as a rectangular hollow plate with round edges, the second and third holes 103b, 103c for the microphones 105a, 105b are mounted in the bottom side 153 of the housing 101 and the common hole 103a shared by both microphones 105a, 105b is mounted in the front side 161.

In an alternative implementation form, the second and third holes 103b, 103c for the microphones 105a, 105b are mounted in the top side 151 of the housing 101 and the common hole 103a shared by both microphones 105a, 105b is mounted in the front side 161. In an alternative implementation form, the second and third holes 103b, 103c for the microphones 105a, 105b are mounted in the bottom side 153 of the housing 101 and the common hole 103a shared by both microphones 105a, 105b is mounted in the back side 163.

In an alternative implementation form, the second and third holes 103b, 103c for the microphones 105a, 105b are mounted in the top side 151 of the housing 101 and the common hole 103a shared by both microphones 105a, 105b is mounted in the back side 163.

In FIG. 2, there are two holes 103b, 103c in the short bottom side 153 of the device 200. The common hole 103a of each directional microphone 105a, 105b is placed in the long front side 161 of the device 200. The directivity polar patterns 108 of the two microphones 105a, 105b are directed toward the long front side 161 of the device 200. The angle γ of each microphone 105a, 105b with respect to the horizontal and the angle δ with respect to the vertical determine the recording direction 610, 710, wherein the angle β determines the stereo image width.

The common hole 103a is placed in the front side 161 of the device 200, for instance just under the screen 185 of a Smartphone or tablet. The other two holes 103b, 103c of the two directional microphones 105a, 105b are located in the bottom 153 of the device 200. The directivity polar patterns 108 of these two directional microphones 105a, 105b are directed toward the front side 161 of the device 200. The angle γ respectively δ defined by the position of the front hole, i.e., the common hole 103a, and the position of the bottom holes, i.e., the second 103b and third 103c hole, defines the directivity of the stereo microphone and the recording direction 610, 710 of the microphone arrangement for stereo recording. For a large γ, the directional microphones are oriented towards the top of the portable electronic device. In order to have good quality for user taking place in front of the screen, the angle γ should be selected to be smaller than 45 degrees. For this purpose, the distance d which defines the position of the common hole from the bottom side of the portable electronic device should be selected as small as possible.

Figure 3:
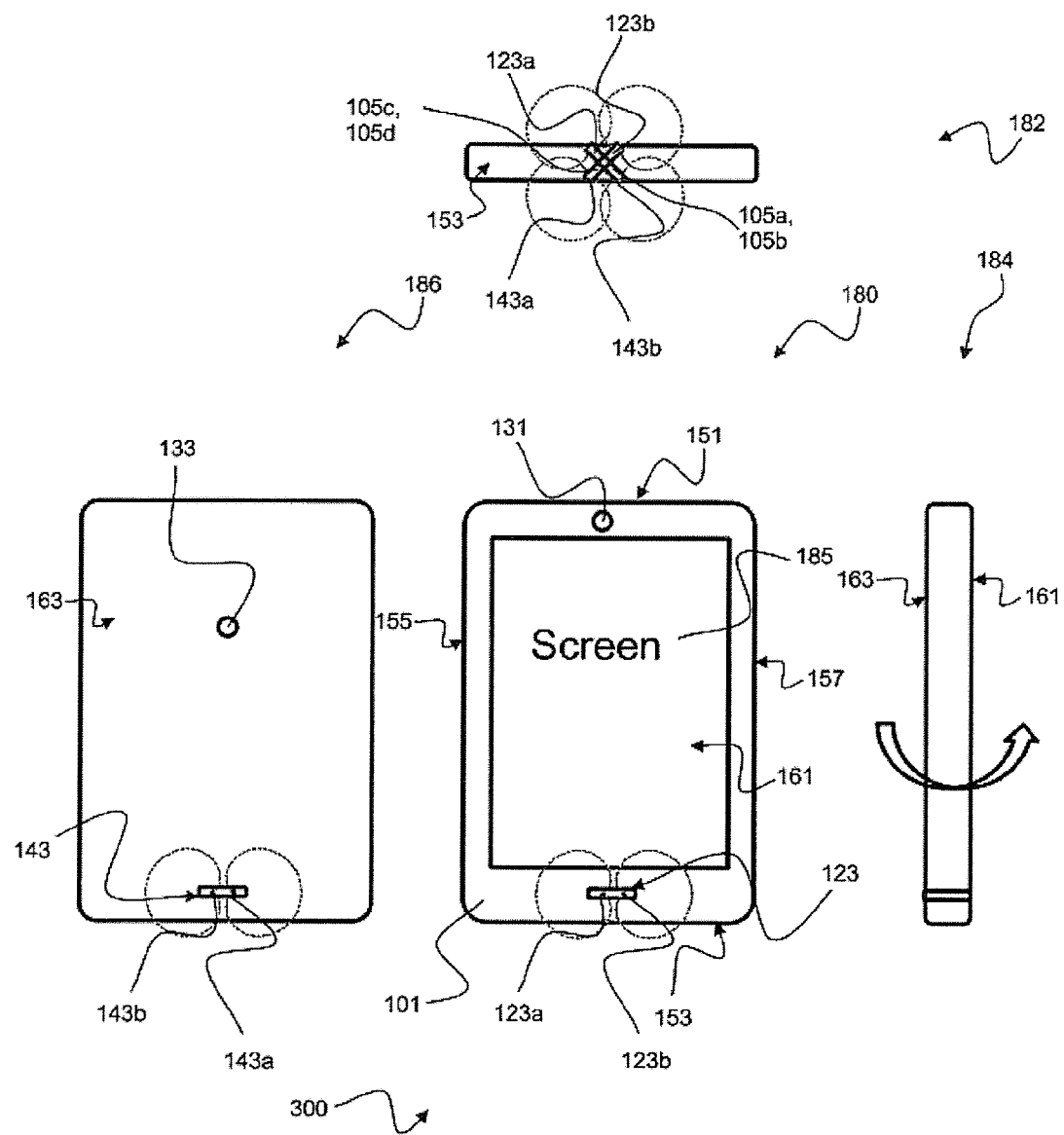
FIG. 3 shows a perspective diagram including front view, back view, bottom view and side view of a portable electronic device arranged in portrait position according to an implementation form.

In alternative embodiments of the ones described in FIG. 2 and FIG. 3, the opposite sound directions of the two directional microphones are directed towards the common hole 103a. The direct sound directions of the two directional microphones are directed towards the two separated holes (103b and 103c).

FIG. 3 shows a perspective diagram including front view 180, back view 186, bottom view 182 and side view 184 of a portable electronic device 300 arranged in portrait position according to an implementation form.

The portable electronic device 300 comprises four directional microphones 105a, 105b, 105c and 105d for stereo sound pickup. Each one of the four directional microphones 105a, 105b, 105c and 105d defines a direct sound direction 106a and an opposite sound direction 106b towards which the directional microphones 105a, 105b, 105c and 105d are directed. The portable electronic device 300 comprises a housing 101 for housing the electronic circuits and printed circuit board of the portable electronic device 300. For each pair of directional microphones 105a, 105b and 105c, 105d at least one common hole is mounted in the housing 101, a first common hole 123a for a first pair 105a, 105b of directional microphones and a second common hole 143a for a second pair 105c, 105d of directional microphones. The first common hole 123a is mounted in the front side 161 of the housing 101, the second common hole 143a is mounted in the back side 163 of the housing 101. The other (complementary) holes 123b and 143b which are required for the directional microphones are mounted in the front side 161 of the housing 101 for 123b and in the back side 163 for 143b, forming an X. By that location of the two common holes 123a, 123b, the four complementary holes and the four microphones 105a, 105b, 105c, 105d directivity polar patterns 108 of the four directional microphones 105a, 105b, 105c, 105d are directed towards the front side 161 and towards the back side 163 of the housing 101.

The first common hole 123a represents a front side hole for the first directional microphone 105a and a back side hole for the second directional microphone 105b, wherein the first directional microphone 105a and the second directional microphone 105b are, for example, mounted above respectively below each other as shown in FIG. 3. The second common hole 123b represents a front side hole for the third directional microphone 105c and a back side hole for the fourth directional microphone 105d, wherein the third directional microphone 105c and the fourth directional microphone 105d are, for example, mounted above respectively below each other as shown in FIG. 3. The third common hole 143a represents a back side hole for the third directional microphone 105c and a front side hole for the fourth directional microphone 105d. The fourth common hole 143b represents a back side hole for the first directional microphone 105a and a front side hole for the second directional microphone 105b.

The first and the second directional microphones 105a, 105b and the third and the fourth directional microphones 105c, 105d are arranged in pairs in the housing 101. The two pairs of directional microphones 105a, 105b, 105c, 105d are arranged in the housing 101 to form an angle β determining a stereo image width of the two stereo microphone arrangements, with 105a and 105c being the first stereo microphone arrangement and 105b and 105d being the second stereo microphone arrangement. In an implementation form, the angle β is between 60 and 120 degrees.

In an implementation form, the portable electronic device 300 comprises a first camera 131, i.e. a front camera mounted in the front side 161 of the housing 101 and a second camera 133, i.e. a rear camera mounted in the back side 163 of the housing 101. A controller (not shown in FIG. 3) controls the selection of the two pairs of microphones 105a, 105b, 105c, 105d and selection of the two cameras 131, 133 according to a selection criterion.

In an implementation form, the portable electronic device 300 comprises two common holes 123 and 143 where 123a and 123b are merged in a common hole 123 and 143a and 143b are merged in a common hole 143.

In an implementation form, the four directional microphones 105a, 105b, 105c, 105d are arranged in the housing 101 such that the direct sound direction 106a of the first directional microphone 105a points to the opposite sound direction 106b of the second directional microphone 105b, and the direct sound direction 106a of the third directional microphone 105c points to the opposite sound direction 106b of the fourth directional microphone 105d.

The portable electronic device 300 shown in FIG. 3 is based on four directional microphones 105a, 105b, 105c and 105d, for instance cardioid microphones, with two common holes 123a and 123b which are placed in the front 161 and two common holes 143a and 143b which are placed in the back sides 163 of the device 300, for instance just under the screen 185 of a Smartphone or tablet. The directional microphones 105a, 105b, 105c and 105d are arranged by pairs in the housing 101. For each pair, the two microphones are pointing in the opposite direction, one toward the front side 161 of the device 300 and the other one to the back side 163. The angle β between the two pairs of microphones 105a, 105b and 105c, 105d determines the stereo image width of the two stereo microphone arrangements 105a & 105c and 105b & 105d.

One of the advantages of this implementation form is the capacity to control the orientation of the stereo recording toward the selected side. In an alternative implementation form, the selection of one of the two stereo microphone arrangements (105a & 105c and 105b & 105d) is controlled together with the selection of the camera. When the terminal is equipped for videoconferencing applications with two cameras, e.g., one camera 131 positioned in the front and another camera 133 on the back 163, the user can select which camera is used and transmitted. In this implementation form, the selection of the stereo microphone arrangement (105a & 105c or 105b & 105d) is associated with the selected camera 131, 133. For example, the directional microphones 105a and 105c form a first stereo microphone arrangement of directional microphones with their direct sound directions pointing towards to the front side, and are selected in case the front camera 131 is selected, and the directional microphones 105b and 105d form a second stereo microphone arrangement of directional microphones with their direct sound directions pointing towards to the backside, and are selected in case the backside camera 133 is selected.

Figure 4:
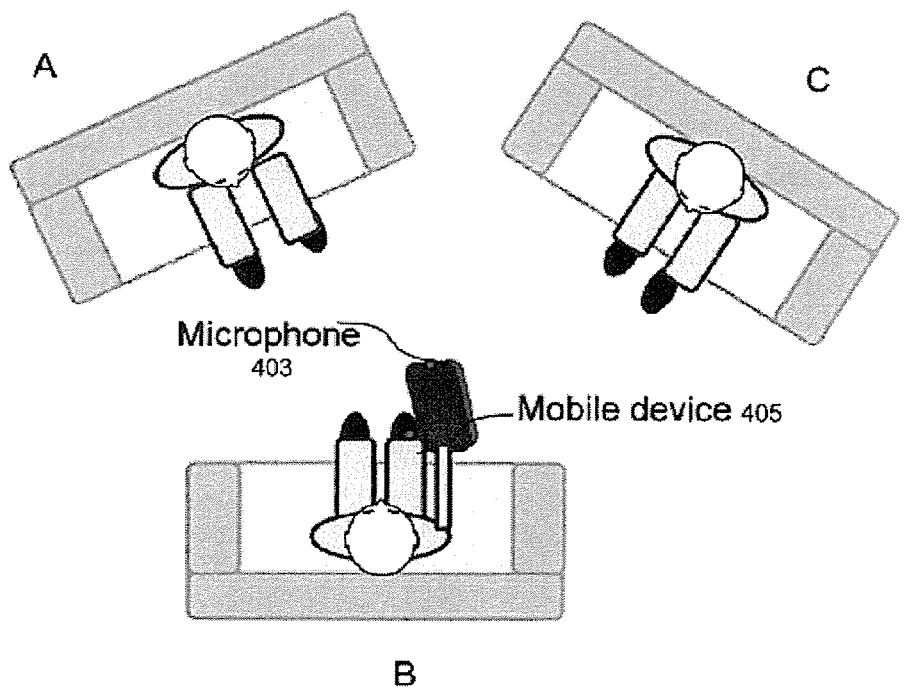
FIG. 4 shows a first scenario for operating a portable electronic device according to an implementation form.

FIG. 4 shows a first scenario 400 for operating a portable electronic device 405 according to an implementation form as described with respect to one of the FIGS. 1 to 3. In the first scenario, the user B holds the device 405 and lets the stereo microphone 403 point to the sound source to make a stereo recording. User B interviews two other users A and C at the same time. User B uses his mobile phone to record the stereo sound scene including the two talkers A and C. When the recorded stereo signal is played out by a stereo reproduction system, A and C are located as if they are just sitting in front of the listener.

Figure 5:
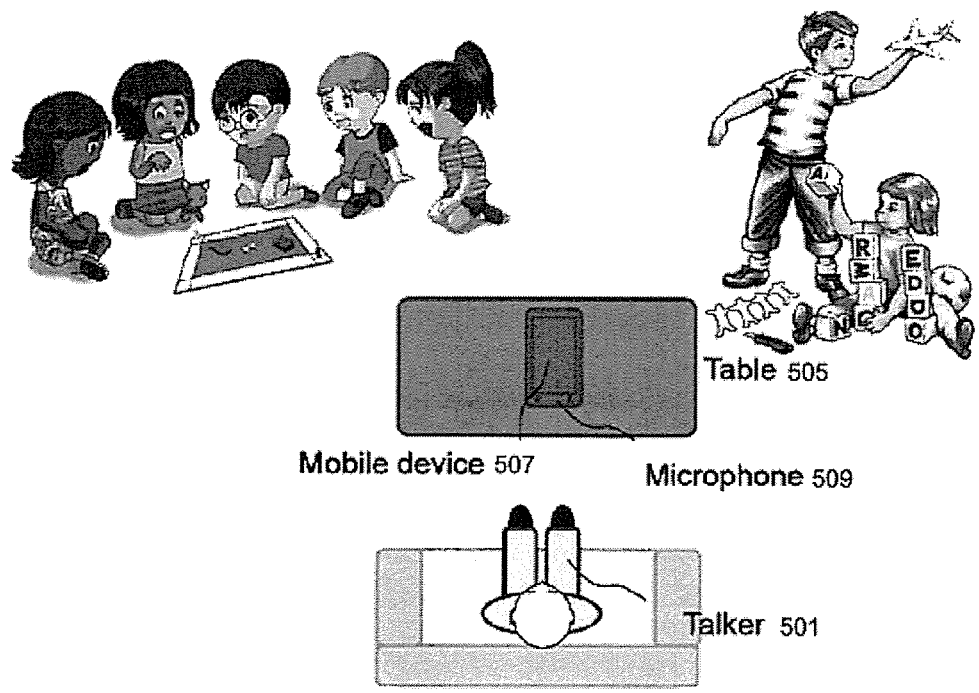
FIG. 5 shows a second scenario for operating a portable electronic device according to an implementation form.
Figure 6:
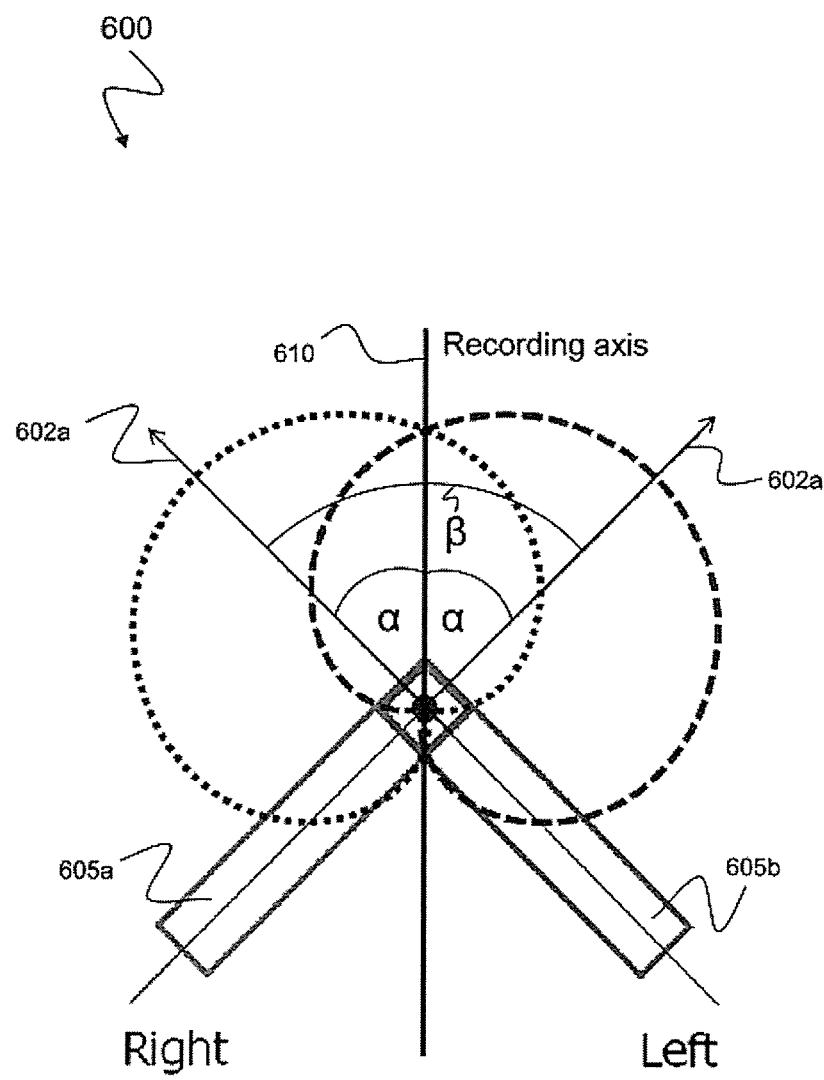
FIG. 6 shows a schematic diagram of two conventional XY microphones for stereo audio recording.
Figure 7:
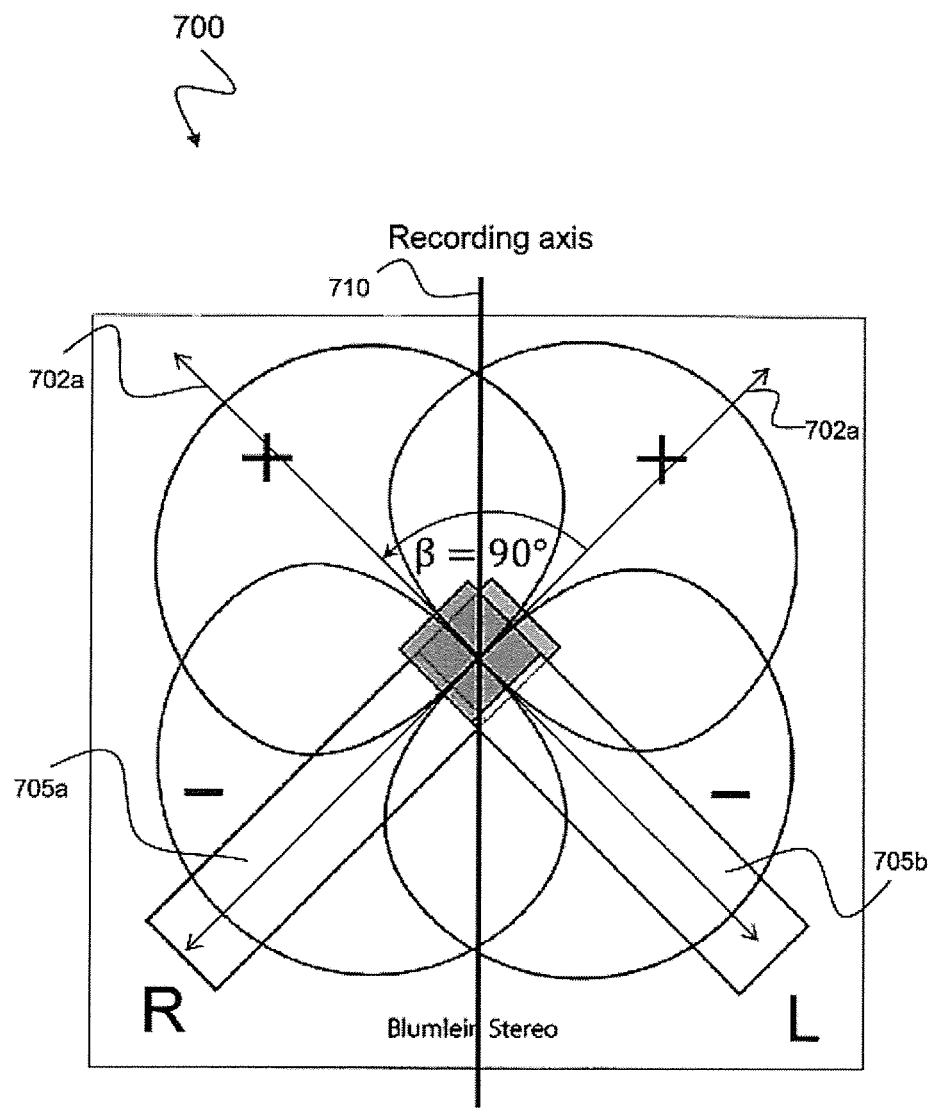
FIG. 7 shows a schematic diagram of a conventional Blumlein pair of microphones for stereo audio recording.

FIG. 5 shows a second scenario 500 for operating a portable electronic device according to an implementation form. In the second scenario, the user 501 puts the device 507 on the table 505 and stereo sound pickup is done for the front. The user 501 just puts his mobile phone 507 on the table 505 and records every sound in his living room. The angle γ defining the orientation of the stereo sound recording, i.e., the central direction of the stereo microphone arrangement which is defined as the direction which is equidistant from each directional microphone direction, can be defined in order to point toward the vertical direction, i.e., in front of the screen, in order to get the best stereo representation of the sound scene.

What is claimed is:

1. A portable electronic device, comprising:
    a housing comprising a front side and a back side that are framed by a top side, a bottom side and two lateral sides, the housing having a plurality of holes; and
    a plurality of directional microphones mounted in the housing and placed coincidentally for stereo sound pickup, each one of the directional microphones defining a main sound axis and each one of the directional microphones defining a direct sound direction and an opposite sound direction which describe opposite directions of the main sound axis;
    wherein the plurality of holes comprises a common hole located in the bottom side of the housing, a second hole located in a bottom section of the front side, and a third hole located in a bottom section of the back side;
    wherein the common hole is shared between first and second directional microphones among the plurality of directional microphones such that the direct sound directions of the first and second directional microphones are pointing through the common hole in different directions, and
    wherein the opposite direction of first directional microphone is oriented towards the second hole and the opposite direction of the second directional microphone is oriented towards the third hole.

2. The portable electronic device of claim 1, wherein the housing is configured for housing the portable electronic device.

3. The portable electronic device of claim 1, wherein directivity polar patterns of the first and second directional microphones are directed towards the bottom side of the housing.

4. The portable electronic device of claim 1, wherein the first and second directional microphones are arranged in the housing such as to form an angle β determining a stereo image width of the two directional microphones, the angle β between 60 and 120 degrees.

5. The portable electronic device of claim 1, wherein the common hole and the second and third holes are arranged in the housing to form an angle γ and an angle δ, respectively, determining a central direction of the coincident arrangement of the first and second directional microphones.

6. The portable electronic device of claim 1, wherein the first and second directional microphones are cardioid microphones or figure-eight microphones.

7. The portable electronic device of claim 6, wherein a thickness of the housing is smaller than 2 cm.

8. The portable electronic device of claim 7, wherein the thickness of the housing is smaller than 1 cm.

9. The portable electronic device of claim 1, wherein a thickness of the housing is smaller than 2 cm.

10. The portable electronic device of claim 9, wherein the thickness of the housing is smaller than 1 cm.

11. A portable electronic device, comprising:
    a housing comprising a front side and a back side that are framed by a top side, a bottom side and two lateral sides, the housing having a plurality of holes; and
    four directional microphones mounted in the housing and placed coincidentally for stereo sound pickup, each one of the four directional microphones defining a main sound axis and each one of the four directional microphones defining a direct sound direction and an opposite sound direction which describe opposite directions of the main sound axis;
    wherein the plurality of holes comprises a first and a second common hole, wherein the first common hole is a common hole shared between the first and the second directional microphones; and wherein the second common hole is a common hole shared between the third and the fourth directional microphones.

12. The portable electronic device of claim 11, wherein the first and the second common holes are located in the front side of the housing.

13. The portable electronic device of claim 11, wherein the first and the third directional microphones and the second and the fourth directional microphones are arranged as pairs of coincident directional microphones in the housing.

14. The portable electronic device of claim 13, wherein the two pairs of coincident directional microphones are arranged in the housing to form an angle β determining a stereo image width of the two pairs of microphones, the angle β between 60 and 120 degrees.

15. The portable electronic device of claim 13, comprising a first camera mounted in the front side of the housing, a second camera mounted in the back side of the housing and a controller configured to control the selection of one of the two pairs of microphones and the selection of one of the two cameras.

16. The portable electronic device of claim 11, wherein the four directional microphones are arranged in the housing such that the direct sound direction of the first directional microphone points to the opposite sound direction of the second directional microphone, and such that the direct sound direction of the third directional microphone points to the opposite sound direction of the fourth directional microphone.

17. A portable electronic device, comprising:
    a housing comprising a front side and a back side that are framed by a top side, a bottom side and two lateral sides, the housing having a plurality of holes; and
    a plurality of directional microphones mounted in the housing and placed coincidentally for stereo sound pickup, each one of the directional microphones defining a main sound axis and each one of the directional microphones defining a direct sound direction and an opposite sound direction which describe opposite directions of the main sound axis;
    wherein the plurality of holes comprises a common hole located in the front side of the housing, and second and third holes located in the bottom side of the housing;
    wherein the common hole is shared between first and second directional microphones among the plurality of directional microphones such that the direct sound directions of the first and second directional microphones are pointing through the common hole in different directions, and
    wherein the opposite direction of first directional microphone is oriented towards the second hole and the opposite direction of the second directional microphone is oriented towards the third hole.

* * * * *